3,475,157
HERBICIDAL α-HALOACETANILIDES
John F. Olin, Ballwin, Mo., assignor to Monsanto Company, St. Louis, Mo., a corporation of Delaware
No Drawing. Continuation of application Ser. No. 644,411, Jan. 17, 1967, which is a division of application Ser. No. 397,656, Sept. 18, 1964. This application Nov. 13, 1968, Ser. No. 784,980
Int. Cl. A01n 9/20; C07c 103/34
U.S. Cl. 71—118                              27 Claims

ABSTRACT OF THE DISCLOSURE

Phytotoxic compositions containing a compound of the formula

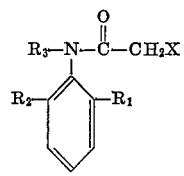

wherein $R_1$ is tertiary alkyl of at least 4 carbon atoms and not more than 10 carbon atoms, $R_2$ is an alkyl of not more than 8 carbon atoms, $R_3$ is selected from the group consisting of primary alkyl, secondary alkyl, alkenyl and alkynyl of not more than 6 carbon atoms, and X is a halogen atom selected from the group consisting of chlorine, bromine, and iodine.

---

This application is a continuation of application Ser. No. 644,411, filed Jan. 17, 1967, which in turn is a division of application Ser. No. 397,656, filed Sept. 18, 1964, now abandoned, which in turn is a continuation-in-part application Ser. No. 134,161, filed Aug. 28, 1961, and now abandoned.

This invention relates to the control of plant systems, including germinating seeds, emerging seedlings, and fully developed plants. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain ortho-substituted and N-substituted α-haloacetanilides as new compounds.

In recent years, the use of chemicals for affecting plant systems has found widespread acceptance among agriculturalists. For example, chemical compositions have been applied to fully develop vegetation to destroy the same in either a selective or nonselective manner. It is relatively easy to destroy the aerial portion of developed vegetation because the vegetation is brought into direct contact with the herbicide composition; however, it is sometimes more difficult to achieve a lethal effect on germinating seeds lying in the soil and seedlings emerging from the soil. Destruction of germinating seeds and emerging seedlings is important in preventing regrowth from the plants after the herbicide composition has either been washed away by rainfall or dissipated by other actions. Unfortunately, it is usually necessary to use an excessive amount of the herbicidal composition in order to affect the germinating seeds and emerging seedlings and thereby achieve long-lasting plant control. The extended control of plant life during the growth of desirable plants is very often involved in preventing the growth of certain undesirable grasses and weeds, such as crab grass and foxtail. Obviously, a more bountiful growth of desirable grasses and crop plants will result if growth of these undesirable weeds and grasses is prevented before the soil is depleted of moisture and nutrients.

Very useful herbicidal compositions containing certain nuclear-substituted and nitrogen-substituted α-haloacetanilides are disclosed and claimed in U.S. Patent 2,863,752, issued to Hamm and Speziale. They discovered that the α-haloacetanilides required an alkyl substituent of up to 6 carbon atoms on the amide nitrogen atom and a single alkyl substituent of up to 4 carbon atoms on the aromatic ring in order to produce herbicidal activity. Even though these α-haloacetanilides of Hamm and Speziale are effective herbicides, it is desirable in man's continued battle with undesirable plant life to improve the effectiveness of these herbicidal compositions.

I have now discovered, much to my surprise, that the unit activity of the N-substituted α-haloacetanilides is increased and the plant spectrum widened at low rates of application by substituting substituents on the aromatic ring in each of the ortho positions with respect to the amide nitrogen atom, one of said substituents being a tertiary alkyl group, and not substituting any other substituents on the aromatic ring.

An object of this invention is to provide novel herbicidal compositions containing as an essential ingredient an N-substituted α-haloacetanilide having substituents in only both ortho positions with respect to the amide nitrogen atom, one of said substituents being a tertiary alkyl group.

Another object of this invention is to provide novel herbicidal compositions having a high unit activity and a wide plant spectrum at low rates of application.

Another object of this invention is to provide novel herbicidal compositions useful for soil sterilization at low rates of application.

Another object of this invention is to provide novel herbicidal compositions which exhibit selectivity in affecting certain undesirable plant systems without affecting desirable plant systems.

Another object of this invention is to provide methods for the suppression and control of vegetation.

Another object of this invention is to provide methods for the suppression and control of undesirable vegetation growing intermingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain N - substituted α - haloacetanilides having no nuclear substituents but ortho substituents and one of said ortho substituents being a tertiary alkyl group.

Other aspects, objects, and advantages of this invention will be apparent from a consideration of the accompanying disclosure and the appended claims.

According to the present invention, there are provided herbicidal concentrate compositions comprising a herbicide adjuvant and an α-haloacetanilide of the formula

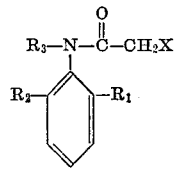

wherein $R_1$ is a tertiary alkyl radical having at least 4 carbon atoms, $R_2$ is an alkyl radical, $R_3$ is selected from the group consisting of primary alkyl, secondary alkyl, alkoxyalkyl, alkenyl and alkynyl radicals, and X is a halogen atom selected from the group consisting of chlorine, bromine, and iodine.

Also, according to the present invention, there are provided herbicidal compositions comprising a carrier, a herbicide adjuvant and a toxic or growth-inhibiting amount of an α-haloacetanilide of the formula as described above.

Also, according to the present invention, there are provided methods for affecting plant systems, including fully developed vegetation as well as germinating seeds and emerging plant seedlings, in a manner to destroy said vegetation and to prevent the growth of said seeds and said emerging seedlings by the application of a toxic or growth-inhibiting amount of an α-haloacetanilide of the formula as described above.

Further, according to the present invention, there are provided, as new compounds, α-haloacetanilides of the formula as described above.

The α-haloacetanilides of this invention have substituents substituted on the aromatic ring in only the ortho positions with respect to the amide nitrogen atom as well as substituents on the amide nitrogen atom. But, there are no meta or para substituents on the aromatic ring. At least one of the ortho substituents, $R_1$ in the formula above, is a tertiary alkyl radical having at least 4 carbon atoms and, preferably, not more than 10 carbon atoms. This tertiary alkyl radical may also have further chain branching. Examples of some suitable tertiary alkyl radicals include: tert-butyl, tert-amyl, 1,1,2-trimethylpropyl, 1,1-dimethyl-butyl, 1,1-dimethylamyl, 1,1,2 - trimethylbutyl, 1,1,3,3 - tetramethylbutyl, 1,1,2,3 - tetramethylbutyl, 1,1,2,2 - tetramethylbutyl, and 1,1-dimethyloctyl groups.

The other ortho substituent, $R_2$ in the formula above, is an alkyl radical. This alkyl radical may have either a straight-chain or a branched-chain configuration, including secondary and tertiary alkyl groups. Preferably, this alkyl radical has not more than 8 carbon atoms; however, there may be a greater number of carbon atoms if desired. Examples of suitable alkyl radicals include methyl, ethyl, isopropyl, n-butyl, sec-butyl, tert-butyl, n-amyl, tert-amyl, n-hexyl, n-heptyl, sec-heptyl, and octyl groups.

The nitrogen substituent, $R_3$ in the formula above, is either a primary alkyl, secondary alkyl, alkoxyalkyl, alkenyl or alkynyl radical which preferably contains not more than 6 carbon atoms. These radicals may be either straight-chain or branched-chain in configuration so long as they are not tertiary. Examples of some suitable primary alkyl and secondary alkyl radicals include methyl, ethyl, isopropyl, n-butyl, sec-butyl, n-hexyl, and 2-methylpentyl. Examples of some suitable alkoxyalkyl radicals include 2 - methoxy - ethyl, 2 - ethoxyethyl, 3-methoxypropyl, 3 - ethoxypropyl, 3 - isopropoxypropyl, and 4-methoxybutyl. Examples of some suitable alkenyl radicals include vinyl, allyl, crotyl, and methallyl. Examples of some suitable alkynyl radicals include ethynyl, 1-propynyl, 2-propynyl, 1-pentynyl, 3-hexynyl, and the like.

The halogen substituent on the α-carbon atom of the haloacetanilide, identified by X in the formula above, may be either a chlorine, bromine or iodine atom.

The α-haloacetanilides of this invention may in general be prepared by haloacetylation of suitable ortho-substituted N - substituted aromatic amines, which may be prepared, for example, by the process disclosed in application S.N. 824,455 filed July 2, 1959, now abandoned, from a primary aromatic amine and a branch-chain olefin. The haloacetylating agent is preferably either a haloacetic anhydride, such as chloroacetic anhydride, or a haloacetyl halide, such as chloroacetyl chloride, bromoacetyl bromide, or the like.

The haloacetylation reaction is preferably conducted in the presence of a suitable liquid reaction medium. The liquid reaction medium must be anhydrous if the acetylating agent is a haloacetic anhydride; however, either anhydrous reaction mediums or mediums containing water can be used with haloacetyl halide acetylating agents. Examples of some suitable reaction mediums for use with either acetylating agent include benzene, diethyl ether, hexane, methylethyl ketone, chlorobenzene, toluene, chloroform, and the xylenes. Since an acid or hydrogen halide is eliminated in the haloacetylation reaction, it is also desirable to have an acid acceptor present in the reaction zone to neutralize the acid formed. Suitable acid acceptors for anhydrous solvent systems include the ortho substituted N - substituted aromatic amine reactants, which may be present in the reaction zone in an amount greater than that required for the acetylation, tertiary amines and pyridine. Acid acceptors in aqueous solvent systems include alkali or alkaline earth hydroxides and alkali or alkaline earth metal carbonates or bicarbonates.

The haloacetylation reaction is generally carried out at a temperature which is below room temperature, preferably in the range of from 0° C. to 15° C. It is not usually desirable to carry out the reaction at a temperature above room temperature because hydrolysis of the haloacetyl halide takes place and the reaction rate is excessively high. It is generally preferable to carry out the reaction at atmospheric pressure although subatmospheric pressure and superatmospheric pressure can be used. Although the halocetylation reaction can be carried out using stoichiometric amounts of reactants, it is usually preferable to use from 2 to 5% of an excess of the acetylating agent. The acetanilide product may be separated from the reaction mixture by methods well known to those skilled in the art, such as by distillation or by fractional crystallization from the reaction medium or from solvents in case the desired product is a soluble substance.

The advantages, desirability and usefulness of the present invention are illustrated by the following examples.

EXAMPLE 1

In this example, 2' - tert-butyl-2-chloro-N-6'-dimethylacetanilide was prepared by chloroacetylation of 2-tert-butyl - N - 6 - dimethylaniline which was prepared from 2 - tert - butyl - 6-methylaniline and methyl iodide. In the first step, 284 g. (1.74 mole) of 2-tert-butyl-6-methylaniline, 284 g. (2 mole) of methyl iodide, and 200 g. of acetonitrile were heated together under reflux for a period of 48 hours while maintaining the temperature in the range of from 75° C. to 80° C. At the end of this time, 250 ml. of water was added and the mixture distilled under vacuum to remove the excess methyl iodide and acetonitrile. Thereafter, 80 g. of sodium hydroxide in 200 ml. of water was added and the mixture thoroughly agitated. Upon standing, two phases formed and the oil layer was removed and washed once with water. This material was distilled to obtain 291 g. of an impure 2-tert - butyl - N - 6 - dimethylaniline which boiled at 110.5–112.5° C. Upon further purification by distillation, 116 g. of the 2 - tert - butyl - N-6-dimethylaniline was obtained boiling at 110–113° C./10.6 mm. Hg.

In the chloroacetylation step, 112 g. (0.63 mole) of 2-tert - butyl - N - 6 - dimethylaniline, 150 ml. of benzene, and 221 g. (0.65 mole) of 50% chloroacetic anhydride in chloroform were mixed together in a reaction flask and heated up to a temperature of about 80° C. over a period of 5 minutes. Heating of the contents in the reaction flask was continued overnight while maintaining the temperature about 80° C. At the end of this time, the reaction mixture was diluted with 250 ml. of water and the solvents removed by distillation. Since crystallization of the product did not take place, this mixture was washed twice with water and once with dilute potassium carbonate solution and distilled to obtain 108 g. of the 2' - tert - butyl - 2 - chloro-N-6'-dimethylacetanilide boiling at 165–70° C./4.2 mm. Hg. The product was further purified by redistillation to obtain 101 g. of product boiling at 146–48° C./0.9 mm. Hg and having a refractive index $n_D^{25}$ 1.5397. The product is a stable, colorless liquid and analyzed 13.78% chlorine as compared with a calculated value of 13.97% chlorine.

EXAMPLE 2

In this example, 2' - tert - butyl-2-chloro-N-ethyl-6'-methylacetanilide was prepared from 160 g. (0.835 mole) of 2 - tert - butyl - N - ethyl-6-methylaniline dissolved in 200 ml. of chloroform and 340 g. (1 mole) of 50% chloroacetic anhydride. The chloroacetic anhydride was added to the 2 - tert - butyl-N-ethyl-6-methylaniline over a period of ½ hour with the exothermic heat of reaction raising the temperature of the mixture to its boiling point. Upon completion of the addition of the chloroacetic anhydride, the reaction mixture was heated overnight at a temperature of about 60° C. under reflux. At the end of this time, the reaction mixture was washed three times with warm water, once with dilute potassium carbonate solution, and distilled to obtain a fraction boiling at 118–153° C./0.5 mm. Hg. This fraction was redistilled to obtain a fraction boiling at 143–146° C./0.5 mm. Hg and another fraction boiling at 135–143° C./0.5 mm. Hg. Upon standing, each of these fractions solidified and was dissolved in 150 ml. of heptane. Crystallization of the product was effected by cooling the heptane solution to obtain colorless, sandy crystals which were recovered by filtration. Crystallization of the mother liquor from the 143–146° C. fraction was also effected. The product from all three crystallizations were combined, dissolved in heptane and decolorized with charcoal to obtain 38 g. of the 2' - tert - butyl - 2-chloro-N-ethyl-6'-methylacetanilide having a melting point of 43–44° C. The chlorine analysis of this product was the same as the calculated value of 15.24% chlorine.

EXAMPLE 3

In this example, 2'-tert-butyl-2-chloro-N-isobutyl - 6'-methylacetanilide was prepared by reacting 43.8 g. (0.2 mole) of N-isobutyl-2-tert-butyl-6-methylaniline dissolved in 100 ml. of benzene with 80 g. of 50% chloroacetic anhydride in chloroform by heating under reflux for ½ hour. Thereafter, the reaction mixture was dissolved in 250 ml. of water and the solvents removed by distillation. Upon standing, a product crystallized out. This product was recrystallized from 80% methanol and further recrystallized from hexane to obtain 30 g. of the 2'-tert-butyl-2-chloro-N-isobutyl-6'-methylacetanilide which is a colorless solid having a melting point of 89.4–90° C. The product had a chlorine analysis of 11.86% chlorine as compared with a calculated value of 11.98% cholrine.

EXAMPLE 4

In this example, N-allyl-2-tert-butyl-6-methylaniline was first prepared from 2-tert-butyl-6-methylaniline and 3-bromopropene and then reacted with chloroacetic anhydride to form N-allyl-2'-tert-butyl-2-chloro-6'-methylacetanilide. In the first step, 163 g. (1 mole) of 2-tert-butyl-6-methylaniline was reacted with 121 g. (1 mole) of 3-bromopropene using 100 g. of acetonitrile as a solvent. The mixture was heated gently to a temperature of about 55° C. and permitted to stand. Upon standing, a yellow color developed and crystallization began to occur. At this time, the mixture was heated at 80° C. for a period of 17 hours. At the end of this time, the reaction mixture was refluxed with 50 g. of sodium hydroxide in 200 ml. of water. The oil layer formed in this step was removed, washed with water, and carefully fractionated to obtain 59 g. of the N-allyl-2-tert-butyl-6-methylaniline boiling at 130–131° C.

In the haloacetylation step, 58.5 g. (0.28 mole) of the N-allyl-2-tert-butyl-6-methylaniline was reacted with 128 g. (0.4 mole) of 50% chloroacetic anhydride. The reaction mixture was heated gently for a period of ½ hour. At the end of this time, water was added and the solvents were removed by distillation. The reaction mixture free of solvents was washed with water and dilute potassium carbonate solution. Crystallization of the product from a mixture of methanol and water was effected, followed by a recrystallization from the same solvent system, to obtain 39 g. of the N-allyl-2'-tert-butyl-2-chloro-6'-methylacetanilide which is a pale tan solid having a melting point of 75.5–76.5° C. Analysis of the product was found to be 12.48% chlorine as compared with a calculated value of 12.67% chlorine.

EXAMPLE 6

In this example, 2'-tert-butyl-2-chloro-N-ethoxyethyl-6'-ethylacetanilide was prepared by reacting 2-tert-butyl-N-ethoxyethyl-6-ethylaniline with chloroacetyl chloride. Into a reaction flask were placed 24.9 g. (0.1 mole) of 2-tert-butyl-N-ethoxyethyl-7-ethylaniline, 125 ml. of benzene 15 g. of potassium carbonate, 15 g. of water and 50 g. of ice. The reaction flask containing these reactants was placed in an ice bath and 15 g. of the chloroacetyl chloride in 50 ml. benzene introduced over a period of 10 minutes with stirring while maintaining the temperature between 0° C. and 15° C. Upon completion of the introduction of the chloroacetyl chloride, the cooling bath was removed and the reaction mixture stirred for an additional 15 minutes. At the end of this time the reaction mixture separated in two layers and the oil layer was separated and washed with water. This material was placed in the hood and evaporated overnight. Upon standing, crystallization did not occur so that the haloacetylation of the aniline was again effected by heating this material, 50 ml. of benzene, and 20 g. of chloroacetic anhydride at a low temperature for a few minutes. Then, 200 ml. of water was added to the mixture which was thereafter boiled for about one minute. At the end of this time, the mixture was evaporated to form a heavy liquid which was washed, neutralized, and distilled to obtain 23.5 g. of the 2'-tert-butyl-2-chloro-N-ethoxyethyl-6'-ethylacetanilide boiling at 190–195° C./1 mm. Hg and having a refractive index $n_D^{25}$ 1.5257. This product is a liquid having a dark amber color. Analysis of the product was found to be 10.75% chlorine as compared with the calculated value of 10.89% chlorine.

EXAMPLE 7

In this example, the pre-emergent herbicidal ratings of some of the ortho-substituted N-substituted α-haloacetanilides of this invention were determined in greenhouse tests in which a specific number of seeds of 12 different plants, each representing a principal botanical type, were planted in greenhouse flats. A good grade of top soil was placed in either 9½" x 5¾" x 2¾" or 9" x 13" x 2" aluminum pans and compacted to a depth of ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, ryegrass, and wild oat; approximately 20 to 30 (a volume measure) of each of pigweed and crabgrass; and either 2 or 3 seeds of soybean. Two different type plantings were made; one wherein the herbicidal composition was applied to the surface of the soil and the other wherein the composition was admixed with or incorporated in the top layer of soil. In the surface-application plantings, the seeds were arranged with 3 soybean seeds across the center of the large aluminum pan, the monocotyledon or grass seeds scattered randomly over one-third of the soil surface, and the dicotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the herbicide composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The herbicide-incorporated soil mixture was used to cover the seeds. The herbicide composition was applied in the surface-application plantings prior to the watering of the seeds. This application of the herbicide composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½ inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0 _____ No phytotoxicity.
1 _____ Slight phytotoxocity.
2 _____ Moderate phytotoxicity.
3 _____ Severe phytotoxicity.

The pre-emergent herbicidal activity of some of the ortho-substituted N-substituted α-haloacetanilides of this invention are recorded in Table 1 for various application rates of the α-haloacetanilide in both surface and soil-incorporated applications. In Table 1, the various seeds are represented by letters as follows:

A _____ General grass.
B _____ General broadleaf.
C _____ Morning glory.
D _____ Wild oats.
E _____ Bromegrass.
F _____ Ryegrass.
G _____ Radish.
H _____ Sugar beet.
I _____ Foxtail.
J _____ Crabgrass.
K _____ Pigweed.
L _____ Soybean.
M _____ Wild buckwheat.
N _____ Tomato.
O _____ Sorghum.

Individual injury ratings for each plant type are reported in Table I. In addition, the total injury rating for all grass plants and the total injury rating for all broadleaf plants are also reported in Table I. For grasses, the maximum total is 18 for the 6 grass plants at ratings of 3. For broadleafs, the maximum total is 21 for the 7 broadleaf plants at ratings of 3.

TABLE I.—PRE-EMERGENCE HERBICIDAL ACTIVITY OF THE N-SUBSTITUTED ORTHO-SUBSTITUTED α-HALOACETANILIDES

| Compound | Rate, lb./acre | Plant Type | | | | | | | | | | | | | | | Total Injury Rating | | Comments |
|---|---|---|---|---|---|---|---|---|---|---|---|---|---|---|---|---|---|---|---|
| | | A | B | C | D | E | F | G | H | I | J | K | L | M | N | O | Grass | Broadleaf | |
| 2'-tert-butyl-2-chloro-N-6'-dimethylacetanilide | 5 | 3 | 2 | 2 | 3 | 3 | 3 | 1 | 3 | 3 | 3 | 3 | 1 | 1 | 3 | 3 | 18 | 14 | (1) |
| | 0.7 | 3 | 1 | 0 | 3 | 3 | 3 | 1 | 2 | 3 | 3 | 3 | 0 | 0 | 0 | 3 | 18 | 6 | (2) |
| | 0.3 | 3 | 0 | 0 | 0 | 2 | 3 | 0 | 1 | 3 | 3 | 2 | 0 | 0 | 0 | 2 | 13 | 3 | (2) |
| | 0.15 | 2 | 0 | 0 | 0 | 1 | 3 | 0 | 2 | 3 | 3 | 1 | 2 | 0 | 0 | 2 | 12 | 5 | (2) |
| 2'tert-butyl-2-chloro-N-ethyl-6'-methylacetanilide | 5 | 3 | 2 | 0 | 3 | 3 | 3 | 0 | 3 | 3 | 3 | 3 | 0 | 1 | 3 | 3 | 18 | 10 | (1) |
| | 0.7 | 3 | 0 | 0 | 1 | 2 | 3 | 0 | 1 | 3 | 3 | 2 | 0 | 1 | 0 | 2 | 14 | 4 | (2) |
| | 0.3 | 2 | 0 | 0 | 0 | 2 | 3 | 0 | 1 | 3 | 3 | 0 | 0 | 0 | 0 | 0 | 11 | 1 | (2) |
| 2'-tert-butyl-2-chloro-N-isobutyl-6'-methylacetanilide | 5 | 2 | 1 | 1 | 0 | 0 | 3 | 0 | 1 | 3 | 3 | 3 | 1 | 0 | 1 | 2 | 11 | 7 | (1) |
| N-allyl-2'-tert-butyl-2-chloro-6'-methylacetanilide | 5 | 2 | 2 | 3 | 0 | 0 | 3 | 0 | 1 | 3 | 3 | 3 | 0 | 0 | 3 | 3 | 12 | 10 | (1) |
| | 1 | 3 | 0 | 0 | 3 | 3 | 3 | 0 | 0 | 3 | 3 | 3 | 0 | 0 | 0 | 3 | 18 | 3 | (2) |
| | 0.15 | 3 | 0 | 0 | 0 | 2 | 3 | 0 | 0 | 3 | 3 | 0 | 0 | 0 | 0 | 2 | 13 | 0 | (2) |
| 2'-tert-butyl-2-chloro-N-ethoxyethyl-6'-ethylacetanilide | 5 | 3 | 3 | 3 | 3 | 3 | 3 | 3 | 3 | 3 | 3 | 3 | 3 | 3 | 3 | 3 | 18 | 21 | (1) |
| | 1 | 3 | 0 | 0 | 3 | 3 | 3 | 0 | 3 | 3 | 1 | 2 | 0 | 1 | 3 | 18 | 4 | (2) |
| | 0.25 | 3 | 0 | 0 | 2 | 3 | 3 | 0 | 1 | 3 | 3 | 0 | 1 | 0 | 0 | 3 | 17 | 2 | (2) |
| | 0.05 | 2 | 0 | 0 | 0 | 0 | 3 | 0 | 0 | 3 | 3 | 0 | 0 | 0 | 0 | 2 | 11 | 0 | (2) |

(1) Surface Application.
(2) Incorporated in Soil.

The data in Table I illustrate the outstanding general and selective herbicidal activity of some of the ortho-substituted nitrogen-substituted α-haloacetanilides of this invention. It will be noted that the nitrogen-substituted α-haloacetanilides which are nuclear-substituted with a tertiary alkyl group in one ortho position and another substituent in the other ortho position possess unusual grass specificity and, furthermore, that these α-haloacetanilides have unusually high activity at extremely low application rates. Although these α - haloacetanilides demonstrate some inherent selectivity at the higher application rates, the selectivity is increased at lower application rates. For example, 2'-tert-butyl-2-chloro-N-6'-dimethylacetanilide has a general grass rating of 3 and a general broadleaf rating of 2 at an application rate of 5 lb./acre but at an application rate of 0.7 lb./acre corresponding ratings are 3 and 1, and at an application rate of 0.3 lb./acre the corresponding ratings become 3 and 0. Thus, not only is good grass specificity obtainable but the rate of application is so low that very economical treatment is possible. The three botanical types or genera of grasses effectively controlled by the α-haloacetanilides of this invention embrace a large number of undesirable plants, or weeds, frequently found in vegetable crops. But these α-haloacetanilides are not limited to removing grasses from broadleaf plants, since the selective action is such that certain genera of grasses can be removed from corn, which is also a genus of grass. The α-haloacetanilides of this invention are also very useful in soil sterilization applications since grass ratings of 3 and broadleaf ratings of 3 are obtained at rates as low as 5 lb./acre. These α-haloacetanilides are also effective in killing nut grass, i.e., *Cyperus rotundus* and *Cyperus esculentus*.

EXAMPLE 8

In this example, the lack of herbicidal activity of closely related compounds which do not have the structure of the ortho-substituted N-substituted α-haloacetanilides of this invention is demonstrated. Pre-emergent greenhouse tests were used in this example and the planting of the seeds was accomplished in the same manner as described in Example 7. The data obtained are reported in Table II wherein the identification of the seeds is the same as that in the previous example and the herbicidal ratings given also have the same definition.

TABLE II.—COMPARISON OF PRE-EMERGENCE HERBICIDAL ACTIVITY OF VARIOUS α-HALOACETANILIDES

| Compound | A | B | C | D | E | F | G | H | I | J | K | L | M | N | O | Grass | Broad leaf | Comments |
|---|---|---|---|---|---|---|---|---|---|---|---|---|---|---|---|---|---|---|
| 2′-tert-Butyl-2-chloro-N-isobutyl-6′-methylacetanilide | 2 | 1 | 1 | 0 | 0 | 3 | 0 | 1 | 3 | 3 | 3 | 1 | 0 | 1 | 2 | 11 | 7 | At 5 lb./acre. |
| 4′-tert-Butyl-2-chloro-N-isobutyl-2′-methylacetanilide | 0 | 0 | 2 | 0 | 0 | 0 | 0 | 0 | 0 | 0 | 0 | 0 | 0 | 0 | 0 | 0 | 2 | Do. |
| 2′-tert-Butyl-2-chloro-N-ethyl-6′-methylacetanilide | 3 | 2 | 0 | 3 | 3 | 3 | 0 | 3 | 3 | 3 | 3 | 0 | 1 | 3 | 3 | 18 | 10 | Do. |
| 4′-tert-Butyl-2-chloro-N-ethyl-2′-methylacetanilide | 1 | 0 | 0 | 0 | 0 | 0 | 0 | 0 | 3 | 2 | 0 | 0 | 0 | 0 | 0 | 5 | 0 | Do. |
| 2′-tert-Butyl-2-chloro-N-isobutyl-6′-methylacetanilide | 2 | 1 | 1 | 0 | 0 | 3 | 0 | 1 | 3 | 3 | 3 | 1 | 0 | 1 | 2 | 11 | 7 | Do. |
| 2′-tert-Butyl-2-chloro-N-isobutyl-acetanilide | 0 | 0 | 0 | 0 | 0 | 2 | 0 | 0 | 0 | 2 | 0 | ---- | 0 | 0 | 0 | 4 | 1 0 | Do. |
| 2′-tert-Butyl-2-chloro-N-ethyl-6′-methylacetanilide | 2 | 0 | 0 | 0 | 2 | 3 | 0 | 1 | 3 | 3 | 0 | 0 | 0 | 0 | 0 | 11 | 1 | At 0.3 lb./acre. |
| 2′-tert-Butyl-2-chloro-N-ethylacetanilide | 1 | 0 | 0 | 0 | 0 | 1 | 0 | 0 | 3 | 3 | 0 | ---- | 0 | 0 | 0 | 7 | 1 0 | Do. |
| 2′-tert-Butyl-2-chloro-N-6′-dimethylacetanilide | 3 | 0 | 0 | 0 | 2 | 3 | 0 | 1 | 3 | 3 | 2 | 0 | 0 | 0 | 2 | 13 | 3 | Do. |
| 2′-tert-Butyl-2-chloro-N-ethyl-6′-methylacetanilide | 2 | 0 | 0 | 0 | 2 | 3 | 0 | 1 | 3 | 3 | 0 | 0 | 0 | 0 | 0 | 11 | 1 | Do. |
| 2′-tert-Butyl-2-chloro-6′-methylacetanilide | 3 | 3 | 3 | 1 | 2 | 3 | 0 | 1 | 3 | 3 | 3 | 3 ---- | | 3 | 3 | 15 | 1 13 | Do. |

¹ One species missing.

The first two comparisons in Table II demonstrate the criticality of the positioning of the tertiary alkyl group on the aromatic ring of an N-substituted ortho-substituted α-haloacetanilide. Thus, the location of a tert-butyl group in the para position instead of an ortho position of an N-substituted ortho-substituted α-chloroacetanilide resulted in no substantial herbicidal activity at a rate of application of 5 lb./acre as compared with a similar compound of this invention having the tert-butyl substituted in an ortho position. Also, the result was essentially the same for both primary alkyl, i.e., ethyl, and secondary alkyl, i.e., isobutyl, substituents on the nitrogen atom.

In the second two comparisons reported in Table II, the effect of omitting the nuclear substituent from N-substituted α-chloroacetanilides having an isobutyl group in one case and an ethyl group in the other case substituted on the amide nitrogen atom is demonstrated. The herbicidal activity was found to be extremely low for both compounds even though each compound had one ortho tert-butyl substituent.

The necessity for a substituent on the amide nitrogen atom is demonstrated in the last comparison in Table II. The effect of this substituent is primarily an improvement in selectivity; that is, the unit activity with respect to broadleaf plants is very low whereas the unit activity with respect to grass plants remains practically unchanged. Thus, at application rates of 0.3 lb./acre, di-ortho substituted α-chloroacetanilides having substituents on the amide nitrogen atom had general grass and general broadleaf ratings of 3 and 0, respectively, for one compound and 2 and 0, respectively, for the other compound whereas the α-chloroacetanilide free of N-substitution had a general grass rating of 3 and a general broadleaf rating of 3 at the same rate of application.

EXAMPLE 9

In this example, the contact herbicidal activity of some of the α-haloacetanilides of this invention was determined in greenhouse tests. The α-haloacetanilide to be tested was applied in spray form to 21-day-old specimens of the same grasses and broadleaf plants as used in the pre-emergent tests described in Example 7. The same number of seeds of the same plants used in Example 7 were planted in the 9½″ x 5¾″ x 2¾″ aluminum pans arranged in the same manner with a soybean seed in diagonal corners as described in Example 7. After the plants were 21 days old, each aluminum pan was sprayed with 6 ml. of a 0.5% concentration solution of the candidate chemical, corresponding to a rate of approximately 9 lbs. per acre. This herbicidal solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed 14 days later and are reported in Table III. The herbicidal ratings recorded in Table III have the same meaning as stated in Example 7.

TABLE III.—CONTACT HERBICIDAL ACTIVITY OF CERTAIN ORTHO-SUBSTITUTED α-HALOACETANILIDES

| Compound | General Grass | General Broadleaf |
|---|---|---|
| 2′-tert-butyl-2-chloro-N-ethyl-6′-methylacetanilide | 2 | 0 |
| 2′-tert-butyl-2-chloro-N-isobutyl-6′-methylacetanilide | 1 | 0 |
| N-allyl-2′-tert-butyl-2-chloro-6′-methylacetanilide | 1 | 1 |

The herbicidal compositions of this invention are either particulate solid (i.e., dusts) or liquid concentrate compositions comprising the active ingredient and either a particulate solid or liquid herbicidal adjuvant which are formulation aids or conditioning agent permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual grass specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the α-haloacetanilides of this invention.

In general, the α-haloacetanilides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent but may merely be dispersed or suspended in the extending agent as a suspension or emulsion. Also, the α-haloacetanilides may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, methanol, butanediol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid extending agents in the form of particulate solids are very useful in the practice of the present invention because of the low solubility properties of the α-haloacetanilides of this invention. In using this type of extending agent, the active ingredient is either adsorbed or dispersed on or in the finely divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipiated calcium phosphate, precipitated calcium carbonate, calcined magnesia, and colloidal silica; and other solid materials such as powdered cork, powdered wood and powdered pecan or walnut shells. These materials are used in finely divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also the extending agent applied as a wettable powder is used in very finely divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or nonionic types. including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enabled the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficulty soluble α-haloacetanilide in the liquid extending agent. However, the liquid extending agent must be selected not only on the basis of the amount of the α-haloacetanilide dissolved but also upon the basis of the solution temperature of the total composition. Thus, in some formulations, a particular combination of solvents give a sufficiently low solvent temperature but the amount of the α-haloacetanilide dissolved or dispersed in the mixture is insufficient and a suitable surface active agent must be selected in order that more α-haloacetanilide can be dispersed in the composition. Preferably, the concentrate composition has a solution temperature below 0° C. although compositions having solution temperatures as high as 20° C. can be used.

The concentration of a α-haloacetanilide in the particulate solid or dust concentrate composition of this invention may vary over wide ranges depending upon the nature of the solid extending agent and the intended use of the composition. Since the α-haloacetanilides of this invention have very high toxicities and are applied at very low rates in order to obtain selectivity, the concentration of the active ingredient in the dust composition may be very low and may comprise as little as 1% or less by wt. of the total dust composition. By contrast, when the dust composition is to be used for soil sterilization, it may be desirable to have a very high concentration of active ingredient and for such use the active ingredient may comprise as much as 5% to 98% by wt. of the total composition. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by wt. of the composition.

The carrier material, used for the uniform distribution of the α-haloacetanilide in an herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner.

Thus, the dust and liquid compositions may be applied to the foliage of growing plants by the use of power dusters, broom and hand sprayers, and spray dusters. The compositions can also be very suitably applied from airplanes as a dust or a spray because the herbicidal compositions of this invention are effective in a very low dosage. In order to prevent growth of germinating seeds or emerging seedlings, the dust and liquid compositions are applied to the soil according to conventional methods, and, preferably, distributed in the soil to a depth of at least ½ inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the α-haloacetanilide to the plant system is essential in the practice of the present invention. The exact dosage to be applied is dependent not only upon the specific α-haloacetanilide but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of α-haloacetanilide per acre but lower or higher rates might be applied in some cases. In non-selective pre-emergent treatments, these herbicidal compositions are usually applied at a somewhat lower rate than in foliage treatments but at a rate which is ordinarily within the same general range; that is, at a rate in the range of 1 to 25 lbs. per acre. However, because of the unusually high unit activity possessed by the nitrogen-substituted α-haloacetanilides of this invention, soil sterilization is ordinarily accomplished at a rate of application in the range of 1 to 10 lbs. per acre. In selective pre-emergent applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

Although the active ingredient in the herbicidal compositions of this invention is preferably an ortho-substituted N-substituted α-haloacetanilide as described in this specification, other α-haloacetanilides having other nuclear substitution or free of amide nitrogen substitution may also be present in the herbicidal compositions and contribute to the activity of the composition. However, the essential active ingredient of the herbicidal compositions of this invention is the ortho-substituted N-substituted α-haloacetanilide disclosed in this specification. Of course, one skilled in the art will understand that mixtures of various ortho-substituted N-substituted α-haloacetanilides can also be used.

Reasonable variation and modification of the invention as described are possible, the essence of which is that there have been provided (1) herbicidal concentrate compositions comprising an herbicidal adjuvant and, as an essential active ingredient, an ortho-substituted N-substituted α-haloacetanilide, (2) herbicidal toxicant compositions comprising an herbicidal adjuvant, a carrier, and, as an essential active ingredient, a toxic or growth-inhibiting amount of an ortho-substituted N-substituted α-haloacetanilide, (3) methods for suppression and control of undesirable vegetation, including full grown plants as well as germinating seeds and emerging seedlings, by the application of an ortho-substituted N-substituted α-halo- acetanilide thereto, and (4) certain ortho-substituted N-substituted α-haloacetanilides as new compounds.

I claim:

1. An herbicidal concentrate composition comprising an herbicidal adjuvant and, as an essential active ingredient, an effective amount of an α-haloacetanilide of the formula

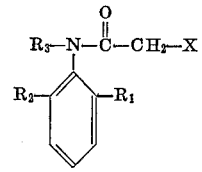

wherein $R_1$ is tertiary alkyl of at least 4 and not more than 10 carbon atoms, $R_2$ is alkyl of not more than 8 carbon atoms, $R_3$ is selected from the group consisting of primary alkyl, secondary alkyl, alkenyl and alkynyl of not more than 6 carbon atoms, and X is halogen selected from the group consisting of chlorine, bromine and iodine.

2. The herbicidal concentrate composition of claim 1 wherein said $R_3$ is primary alkyl.

3. The herbicidal concentrate composition of claim 1 wherein said $R_3$ is secondary alkyl.

4. The herbicidal concentrate composition of claim 1 wherein said $R_3$ is alkenyl.

5. An herbicidal concentrate composition comprising an herbicidal adjuvant and, as an essential active ingredient, an effective amount of 2'-tert-butyl-2-chloro-N-6'-dimethylacetanilide.

6. An herbicidal concentrate composition comprising an herbicidal adjuvant and, as an essential active ingredient, an effective amount of 2'-tert-butyl-2-chloro-N-ethyl-6'-methylacetanilide.

7. An herbicidal concentrate composition comprising an herbicidal adjuvant and, as an essential active ingredient, an effective amount of 2'-tert-butyl-2-chloro-N-isobutyl-6'-methylacetanilide.

8. An herbicidal concentrate composition comprising an herbicidal adjuvant and, as an essential active ingredient, an effective amount of N-allyl-2'-tert-butyl-2-chloro-6'-methylacetanilide.

9. An herbicidal toxicant composition comprising an herbicidal adjuvant, a carrier, and, as an essential active ingredient, a growth-inhibiting amount of an α-haloacetanilide of the formula

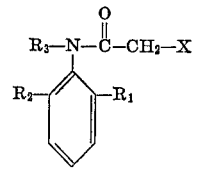

wherein $R_1$ is tertiary alkyl of at least 4 and not more than 10 carbon atoms, $R_2$ is alkyl of not more than 8 carbon atoms, $R_3$ is selected from the group consisting of primary alkyl, secondary alkyl, alkenyl and alkynyl of not more than 6 carbon atoms, and X is halogen selected from the group consisting of chlorine, bromine and iodine.

10. A herbicidal method which comprises applying to soil an effective amount of an α-haloacetanilide of the formula

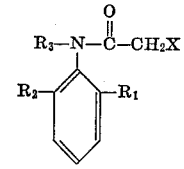

wherein $R_1$ is tertiary alkyl of at least 4 and not more than 10 carbon atoms, $R_2$ is alkyl of not more than 8 carbon atoms, $R_3$ is selected from the group consisting of primary alkyl, secondary alkyl, alkenyl and alkynyl of not more than 6 carbon atoms, and X is halogen selected from the group consisting of chlorine, bromine and iodine.

11. A method of claim 10 wherein $R_3$ is primary alkyl.
12. A method of claim 10 wherein $R_3$ is secondary alkyl.
13. A method of claim 10 wherein $R_3$ is alkenyl.
14. A method of claim 10 wherein the α-haloacetanilide is applied at a rate from about 0.05 to about 50 pounds per acre.
15. A method of claim 10 wherein the α-haloacetanilide is 2'-tert-butyl-2-chloro-N-6'-dimethylacetanilide.
16. A method of claim 10 wherein the α-haloacetanilide is 2'-tert-butyl-2-chloro-N-ethyl-6'-methylacetanilide.
17. A method of claim 10 wherein the α-haloacetanilide is 2'-tert-butyl-2-chloro-N-isobutyl-6'-methylacetanilide.
18. A method of claim 10 wherein the α-haloacetanilide is N-allyl-2'-tert-butyl-2-chloro-6'-methylacetanilide.
19. A herbicidal method which comprises applying to plants an effective amount of an α-haloacetanilide of the formula

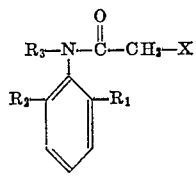

wherein $R_1$ is tertiary alkyl of at least 4 and not more than 10 carbon atoms, $R_2$ is alkyl of not more than 8 carbon atoms, $R_3$ is selected from the group consisting of primary alkyl, secondary alkyl, alkenyl and alkynyl of not more than 6 carbon atoms, and X is halogen selected from the group consisting of chlorine, bromine and iodine.

20. A method of claim 19 wherein $R_3$ is primary alkyl.
21. A method of claim 19 wherein $R_3$ is secondary alkyl.
22. A method of claim 19 wherein $R_3$ is alkenyl.
23. A method of claim 19 wherein the α-haloacetanilide is applied at a rate from about 0.05 to about 50 pounds per acre.
24. A method of claim 19 wherein the α-haloacetanilide is 2'-tert-butyl-2-chloro-N-6'-dimethylacetanilide.
25. A method of claim 19 wherein the α-haloacetanilide is 2'-tert-butyl-2-chloro-N-ethyl-6'-methylacetanilide.
26. A method of claim 19 wherein the α-haloacetanilide is 2'-tert-butyl-2-chloro-N-isobutyl-6'-methylacetanilide.
27. A method of claim 19 wherein the α-haloacetanilide is N-allyl-2'-tert-butyl-2-chloro-6'-methylacetanilide.

References Cited

FOREIGN PATENTS 139,051  11/1949  Sweden.

LEWIS GOTTS, Primary Examiner
CATHERINE L. MILLS, Assistant Examiner

U.S. Cl. X.R.
260—562